US012756633B2

(12) United States Patent
Pateromichelakis et al.

(10) Patent No.: US 12,756,633 B2
(45) Date of Patent: Oct. 6, 2026

(54) DETERMINING APPLICATION DATA AND/OR ANALYTICS

(71) Applicant: Lenovo (Singapore) Pte. Ltd., New Tech Park (SG)

(72) Inventors: Emmanouil Pateromichelakis, Viersen (DE); Dimitrios Karampatsis, Ruislip (GB)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 18/717,756

(22) PCT Filed: Jan. 27, 2022

(86) PCT No.: PCT/EP2022/051966
§ 371 (c)(1),
(2) Date: Jun. 7, 2024

(87) PCT Pub. No.: WO2023/104346
PCT Pub. Date: Jun. 15, 2023

(65) Prior Publication Data

US 2025/0055902 A1 Feb. 13, 2025

(30) Foreign Application Priority Data

Dec. 10, 2021 (GR) .............................. 20210100868

(51) Int. Cl.
*H04L 41/14* (2022.01)
*H04L 43/0811* (2022.01)
*H04L 67/025* (2022.01)

(52) U.S. Cl.
CPC .......... *H04L 41/14* (2013.01); *H04L 43/0811* (2013.01); *H04L 67/025* (2013.01)

(58) Field of Classification Search
None
See application file for complete search history.

(56) References Cited

U.S. PATENT DOCUMENTS 8,914,810 B1 * 12/2014 Brockners ............. H04L 67/306
719/318
10,833,931 B2 * 11/2020 Brito ....................... H04L 41/22
(Continued)

FOREIGN PATENT DOCUMENTS

WO WO-2017222613 A1 * 12/2017 ............. H04L 43/08
WO WO-2022194397 A1 * 9/2022 ......... H04L 63/0428

OTHER PUBLICATIONS

Motorola, "New SID on Study on Application Data Analytics Enablement Service"; 3GPP TSG-SA WG6 Meeting #45; e-meeting Oct. 11-19, 2021; S6-212396 (Year: 2021).*
(Continued)

*Primary Examiner* — Sandarva Khanal
(74) *Attorney, Agent, or Firm* — Kunzler Needham Hilton

(57) ABSTRACT

One method includes associating, at an application enablement unit, an application data analytics event with a combination of data collection events and network data analytics events based on an application request for end-to-end application related performance analytics. The method includes obtaining a first set of data from data producing entities and/or data analytics producing entities based on the application data analytics event. The method includes configuring a second set of data based on the first set of data. The second set of data includes at least a portion of and/or an abstraction of the first set of data based on the application data analytics event. The method includes deriving application data analytics corresponding to the application data analytics event based on the second set of data.

10 Claims, 11 Drawing Sheets

(56) References Cited

U.S. PATENT DOCUMENTS

| | | | | |
|---|---|---|---|---|
| 11,188,785 | B2 * | 11/2021 | Lee | G06F 18/2113 |
| 11,405,931 | B2 * | 8/2022 | Gupta | H04W 24/04 |
| 11,508,022 | B1 | 11/2022 | Dabell | |
| 11,991,544 | B2 * | 5/2024 | Puente | H04W 8/186 |
| 12,593,266 | B2 * | 3/2026 | Bouazizi | H04W 4/50 |
| 2008/0117899 | A1 * | 5/2008 | Sullivan | H04L 61/45 370/389 |
| 2012/0060198 | A1 * | 3/2012 | Tremblay | H04L 12/1407 726/1 |
| 2013/0031238 | A1 * | 1/2013 | Grossklas | H04L 43/0817 709/224 |
| 2017/0005886 | A1 * | 1/2017 | Dade | H04L 43/065 |
| 2017/0091876 | A1 * | 3/2017 | Bostick | G06Q 50/01 |
| 2017/0200202 | A1 * | 7/2017 | Yu | G06Q 30/0277 |
| 2017/0215094 | A1 * | 7/2017 | Akoum | H04W 16/18 |
| 2018/0102952 | A1 * | 4/2018 | Gopalakrishnan | H04L 67/306 |
| 2019/0215235 | A1 * | 7/2019 | Chou | H04L 43/16 |
| 2019/0222489 | A1 * | 7/2019 | Shan | H04M 15/66 |
| 2019/0356558 | A1 * | 11/2019 | Han | H04L 41/14 |
| 2020/0045559 | A1 * | 2/2020 | Kim | H04W 28/0268 |
| 2020/0358689 | A1 * | 11/2020 | Lee | H04L 43/0817 |
| 2021/0105656 | A1 * | 4/2021 | Estevez | H04W 24/08 |
| 2021/0144076 | A1 * | 5/2021 | Lee | G06F 18/214 |
| 2022/0408293 | A1 * | 12/2022 | Han | H04W 8/24 |
| 2023/0071081 | A1 * | 3/2023 | Hong | H04L 43/04 |
| 2023/0292226 | A1 * | 9/2023 | Bouazizi | H04L 41/5041 |
| 2023/0388386 | A1 | 11/2023 | Thiebaut et al. | |
| 2024/0073709 | A1 | 2/2024 | Karampatsis et al. | |
| 2024/0137282 | A1 | 4/2024 | Onno et al. | |
| 2024/0276198 | A1 * | 8/2024 | Wang | H04W 24/04 |
| 2025/0024284 | A1 | 1/2025 | Pateromichelakis et al. | |
| 2025/0047565 | A1 | 2/2025 | Pateromichelakis et al. | |
| 2025/0047566 | A1 | 2/2025 | Pateromichelakis et al. | |
| 2025/0048213 | A1 | 2/2025 | Pateromichelakis et al. | |
| 2025/0158892 | A1 | 5/2025 | Pateromichelakis et al. | |
| 2025/0219908 | A1 | 7/2025 | Liu et al. | |

OTHER PUBLICATIONS

3GPP, 3rd Generation Partnership Project; Technical Specification Group Services and System Aspects; Architecture enhancements for 5G System (5GS) to support network data analytics services; Release 17; Jun. 2021 (Year: 2021).*

E. Pateromichelakis et al.; "End-to-End Data Analytics Framework for 5G Architecture"; Digital Object Identifier 10.1109/ACCESS.2019.2902984; IEEE Access Journal; vol. 7 p. 40295-40312; Mar. 5, 2019; retrieved online on Aug. 5, 2025 from https://ieeexplore.ieee.org/stamp/stamp.jsp?arnumber=8660442. (Year: 2019).*

PCT/EP2022/051966, "Notification of Transmittal of the International Search Report and the Written Opinion of the International Searching Authority, or the Declaration", International Searching Authority, Jul. 20, 2022, pp. 1-21.

PCT/IB2022/062002, "Notification of Transmittal of the International Search Report and the Written Opinion of the International Searching Authority, or the Declaration", International Searching Authority, Feb. 15, 2023, pp. 1-16.

PCT/IB2022/062004, "Notification of Transmittal of the International Search Report and the Written Opinion of the International Searching Authority, or the Declaration", International Searching Authority, Feb. 15, 2023, pp. 1-14.

M. Anastasopoulos et al., "AI and ML—Enablers for Beyond 5G Networks", 5G PPP Technology Board, May 11, 2021, pp. 1-145.

Lenovo et al., "Discussion on new SID proposal on Integrated Analytics Enablement Service", 3GPP TSG-SA WG6 Meeting #45-e S6-211981, Aug. 25-Sep. 3, 2021, pp. 1-8.

Lenovo et al., "New SID on Study on Application Data Analytics Enablement Service", 3GPP TSG-SA WG6 Meeting #45 bis-e S6-212273, Oct. 11-19, 2021, pp. 1-4.

Lenovo et al., "New SID on Study on Application Data Analytics Enablement Service", 3GPP TSG-SA WG6 Meeting #45 bis-e S6-212396, Oct. 11-19, 2021, pp. 1-4.

3GPP, "3rd Generation Partnership Project; Technical Specification Group Services and System Aspects; Study on SEAL data delivery enabler for vertical applications; (Release 18)", 3GPP TR 23.700-34 V0.1.0, Oct. 2021, pp. 1-10.

3GPP, "3rd Generation Partnership Project; Technical Specification Group Services and System Aspects; Architecture enhancements for 5G System (5GS) to support network data analytics services (Release 17)", 3GPP TS 23.288 V17.1.0, Jun. 2021, pp. 1-192.

3GPP, "3rd Generation Partnership Project; Technical Specification Group Services and System Aspects; Management and orchestration; Architecture framework (Release 17)", 3GPP TS 28.533 V17.0.0, Sep. 2021, pp. 1-30.

U.S. Appl. No. 18/717,837, "Office Action Summary", US Patent and Trademark Office, Aug. 26, 2025, pp. 1-24.

U.S. Appl. No. 18/717,855, "Office Action Summary", US Patent and Trademark Office, Aug. 27, 2025, pp. 1-18.

* cited by examiner

DETERMINING APPLICATION DATA AND/OR ANALYTICS

FIELD

The subject matter disclosed herein relates generally to wireless communications and more particularly relates to determining application data and/or analytics.

BACKGROUND

In certain wireless communications networks, application data and/or analytics may be useful for application service providers and/or verticals using the wireless communications networks for providing application services. In such networks, the application data and/or analytics may not be available at a device that needs such data and/or analytics.

BRIEF SUMMARY

Methods for determining application data and/or analytics are disclosed. Apparatuses and systems also perform the functions of the methods. One embodiment of a method includes associating, at an application enablement unit, an application data analytics event with a combination of a plurality of data collection events and a plurality of network data analytics events based on an application request for end-to-end application related performance analytics. In some embodiments, the method includes obtaining a first set of data from a plurality of data producing entities, data analytics producing entities, or a combination thereof based on the application data analytics event. In certain embodiments, the method includes configuring a second set of data based on the first set of data. The second set of data includes at least a portion of the first set of data, an abstraction of the first set of data, or a combination thereof based on the application data analytics event. In various embodiments, the method includes deriving application data analytics corresponding to the application data analytics event based on the second set of data.

One apparatus for determining application data and/or analytics includes an application enablement unit. In some embodiments, the apparatus includes a processor that: associates an application data analytics event with a combination of a plurality of data collection events and a plurality of network data analytics events based on an application request for end-to-end application related performance analytics; obtains a first set of data from a plurality of data producing entities, data analytics producing entities, or a combination thereof based on the application data analytics event; configures a second set of data based on the first set of data, wherein the second set of data comprises at least a portion of the first set of data, an abstraction of the first set of data, or a combination thereof based on the application data analytics event; and derives application data analytics corresponding to the application data analytics event based on the second set of data.

Another embodiment of a method for determining application data and/or analytics includes receiving, at a user equipment, a request from an application enablement entity. In some embodiments, the method includes determining local user equipment data, analytics, or a combination thereof in response to receiving the request from the application enablement entity. In certain embodiments, the method includes transmitting the local user equipment data, analytics, or the combination thereof to the application enablement entity.

Another apparatus for determining application data and/or analytics includes a user equipment. In some embodiments, the apparatus includes a receiver that receives a request from an application enablement entity. In various embodiments, the apparatus includes a processor that determines local user equipment data, analytics, or a combination thereof in response to receiving the request from the application enablement entity. In certain embodiments, the apparatus includes a transmitter that transmits the local user equipment data, analytics, or the combination thereof to the application enablement entity.

A further embodiment of a method for determining application data and/or analytics includes receiving, at a network device, a request from an application enablement entity. In some embodiments, the method includes determining, based on the request from the application enablement entity, a first set of data, a second set of data, or a combination thereof. In certain embodiments, the method includes transmitting the first set of data, the second set of data, or the combination thereof to the application enablement entity.

A further apparatus for determining application data and/or analytics includes a network device. In some embodiments, the apparatus includes a receiver that receives a request from an application enablement entity. In various embodiments, the apparatus includes a processor that determines local user equipment data, analytics, or a combination thereof in response to receiving the request from the application enablement entity. In certain embodiments, the apparatus includes a transmitter that transmits the local user equipment data, analytics, or the combination thereof to the application enablement entity.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
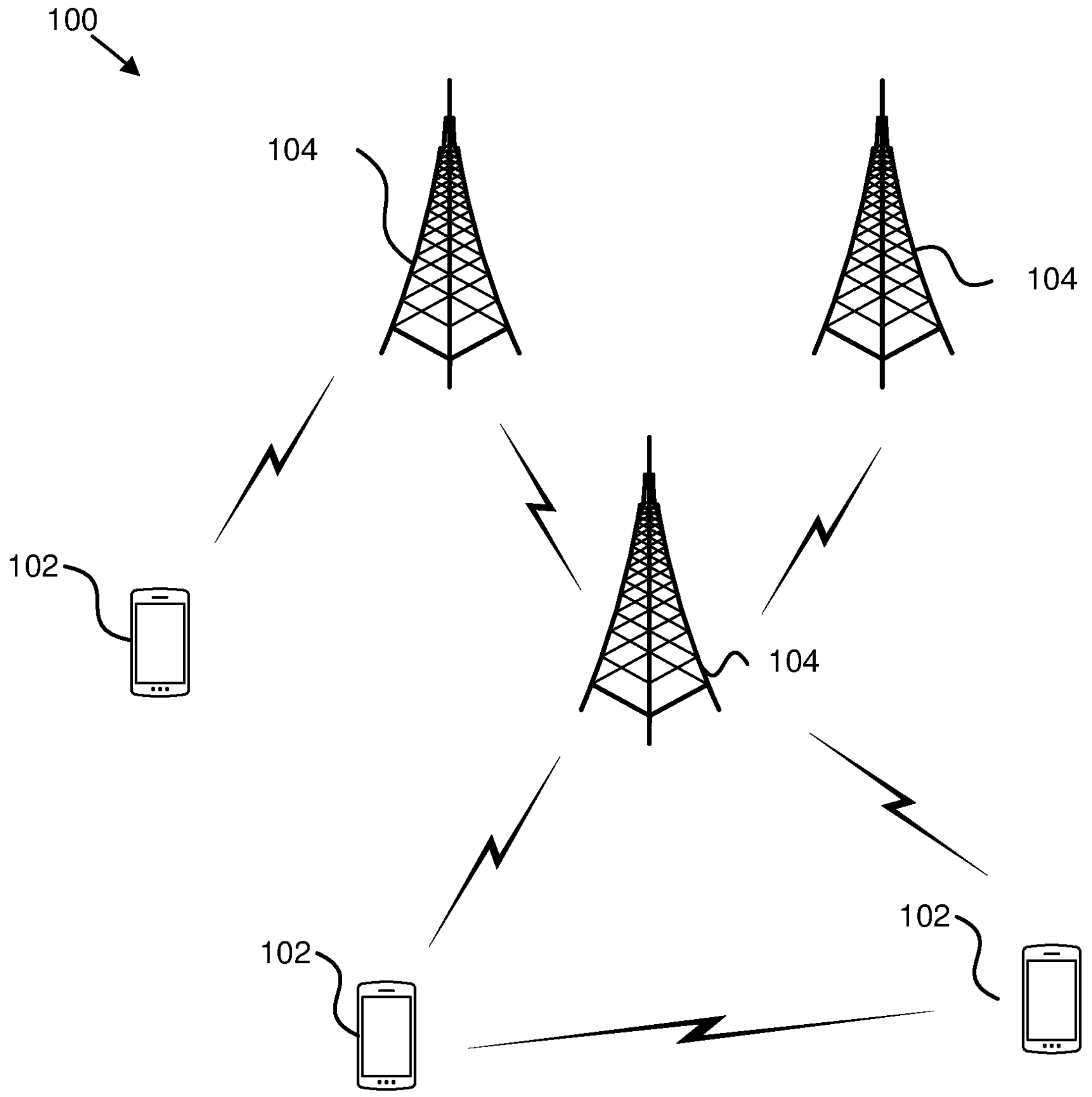
FIG. 1 is a schematic block diagram illustrating one embodiment of a wireless communication system for determining application data and/or analytics.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the FIGS. illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for determining application data and/or analytics. In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), aerial vehicles, drones, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, an application client at the device, an application enabler client at the device, an application data analytics enabler client at the device, or by other terminology used in the art. The remote units 102 may communicate directly with one or more of the network units 104 via UL communication signals. In certain embodiments, the remote units 102 may communicate directly with other remote units 102 via sidelink communication.

The network units 104 may be distributed over a geographic region. In certain embodiments, a network unit 104 may also be referred to and/or may include one or more of an access point, an access terminal, a base, a base station, a location server, a core network ("CN"), a radio network entity, a Node-B, an evolved node-B ("eNB"), a 5G node-B ("gNB"), a Home Node-B, a relay node, a device, a core network, an aerial server, a radio access node, an access point ("AP"), new radio ("NR"), a network entity, an access and mobility management function ("AMF"), a unified data management ("UDM"), a unified data repository ("UDR"), a UDM/UDR, a policy control function ("PCF"), a radio access network ("RAN"), a network slice selection function ("NSSF"), an operations, administration, and management ("OAM"), a session management function ("SMF"), a user plane function ("UPF"), an application function, an authentication server function ("AUSF"), security anchor functionality ("SEAF"), trusted non-3GPP gateway function ("TNGF"), an application function, a service enabler architecture layer ("SEAL") function, a vertical application enabler server, an edge enabler server, an edge configuration server, a mobile edge computing platform function, a mobile edge computing application, an application data analytics enabler server, a SEAL data delivery server, a middleware entity, a network slice capability management server, or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with NR protocols standardized in third generation partnership project ("3GPP"), wherein the network unit 104 transmits using an OFDM modulation scheme on the downlink ("DL") and the remote units 102 transmit on the uplink ("UL") using a single-carrier frequency division multiple access ("SC-FDMA") scheme or an orthogonal frequency division multiplexing ("OFDM") scheme. More generally, however, the wireless communication system 100 may implement some other open or proprietary communication protocol, for example, WiMAX, institute of electrical and electronics engineers ("IEEE") 802.11 variants, global system for mobile communications ("GSM"), general packet radio service ("GPRS"), universal mobile telecommunications system ("UMTS"), long term evolution ("LTE") variants, code division multiple access 2000 ("CDMA2000"), Bluetooth®, ZigBee, Sigfoxx, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In certain embodiments, a network unit 104 may associate, at an application enablement unit, an application data analytics event with a combination of a plurality of data collection events and a plurality of network data analytics events based on an application request for end-to-end application related performance analytics. In some embodiments, the network unit 104 may obtain a first set of data from a plurality of data producing entities, data analytics producing entities, or a combination thereof based on the application data analytics event. In certain embodiments, the network unit 104 may configure a second set of data based on the first set of data. The second set of data includes at least a portion of the first set of data, an abstraction of the first set of data, or a combination thereof based on the application data analytics event. In various embodiments, the network unit 104 may derive application data analytics corresponding to the application data analytics event based on the second set of data. Accordingly, the network unit 104 may be used for determining application data and/or analytics.

In various embodiments, a remote unit 102 may receiving a request from an application enablement entity. In some embodiments, the remote unit 102 may determine local user equipment data, analytics, or a combination thereof in response to receiving the request from the application enablement entity. In certain embodiments, the remote unit 102 may transmit the local user equipment data, analytics, or the combination thereof to the application enablement entity. Accordingly, the remote unit 102 may be used for determining application data and/or analytics.

In certain embodiments, a network unit 104 may receiving a request from an application enablement entity. In some embodiments, the network unit 104 may determine, based on the request from the application enablement entity, a first set of data, a second set of data, or a combination thereof. In certain embodiments, the network unit 104 may transmit the first set of data, the second set of data, or the combination thereof to the application enablement entity. Accordingly, the network unit 104 may be used for determining application data and/or analytics.

Figure 2:
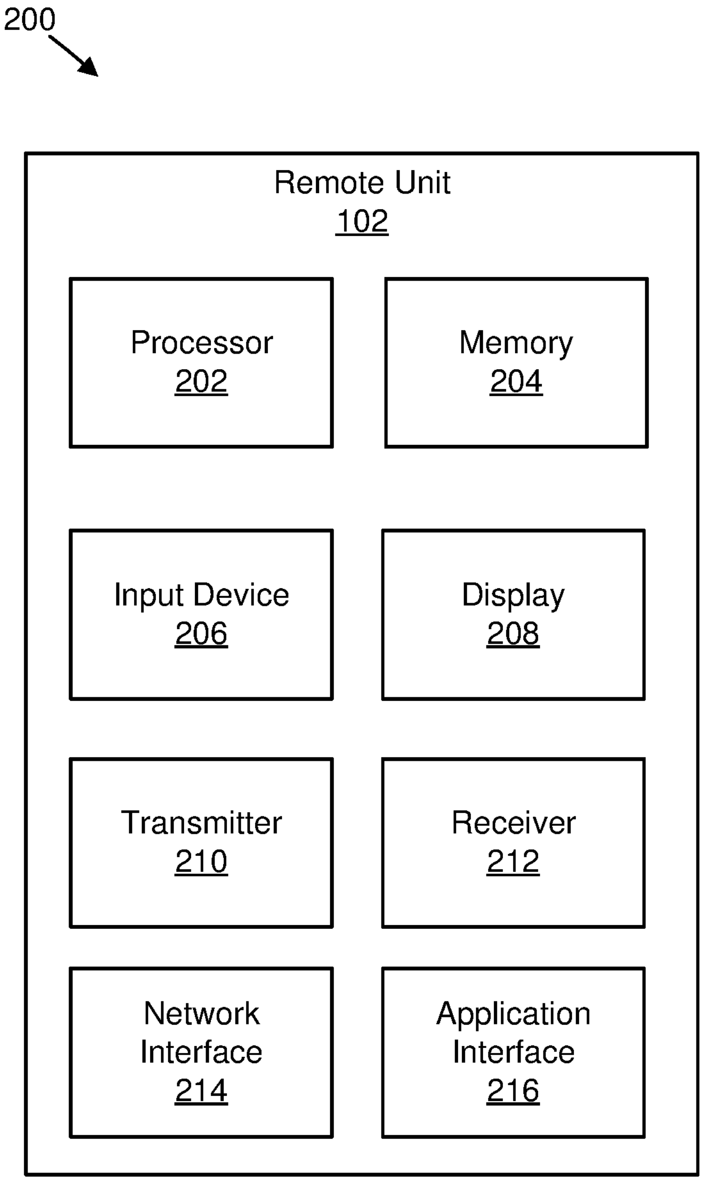
FIG. 2 is a schematic block diagram illustrating one embodiment of an apparatus that may be used for determining application data and/or analytics.

FIG. 2 depicts one embodiment of an apparatus 200 that may be used for determining application data and/or analytics. The apparatus 200 includes one embodiment of the remote unit 102. Furthermore, the remote unit 102 may include a processor 202, a memory 204, an input device 206, a display 208, a transmitter 210, a receiver 212, a network interface 214, and an application interface 216. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, a liquid crystal display ("LCD"), a light emitting diode ("LED") display, an organic light emitting diode ("OLED") display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

In certain embodiments, the receiver 212 receives a request from an application enablement entity. In various embodiments, the apparatus includes a processor that determines local user equipment data, analytics, or a combination thereof in response to receiving the request from the application enablement entity. In certain embodiments, the apparatus includes a transmitter that transmits the local user equipment data, analytics, or the combination thereof to the application enablement entity.

Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver. The network interface 214 (e.g., one or more network interfaces) may support 3GPP reference points such as Uu, N1, PC5, and so forth. Other network interfaces may be supported as understood by one of ordinary skill in the art. The application interface 216 (e.g., one or more application interfaces) may support 3GPP APIs.

Figure 3:
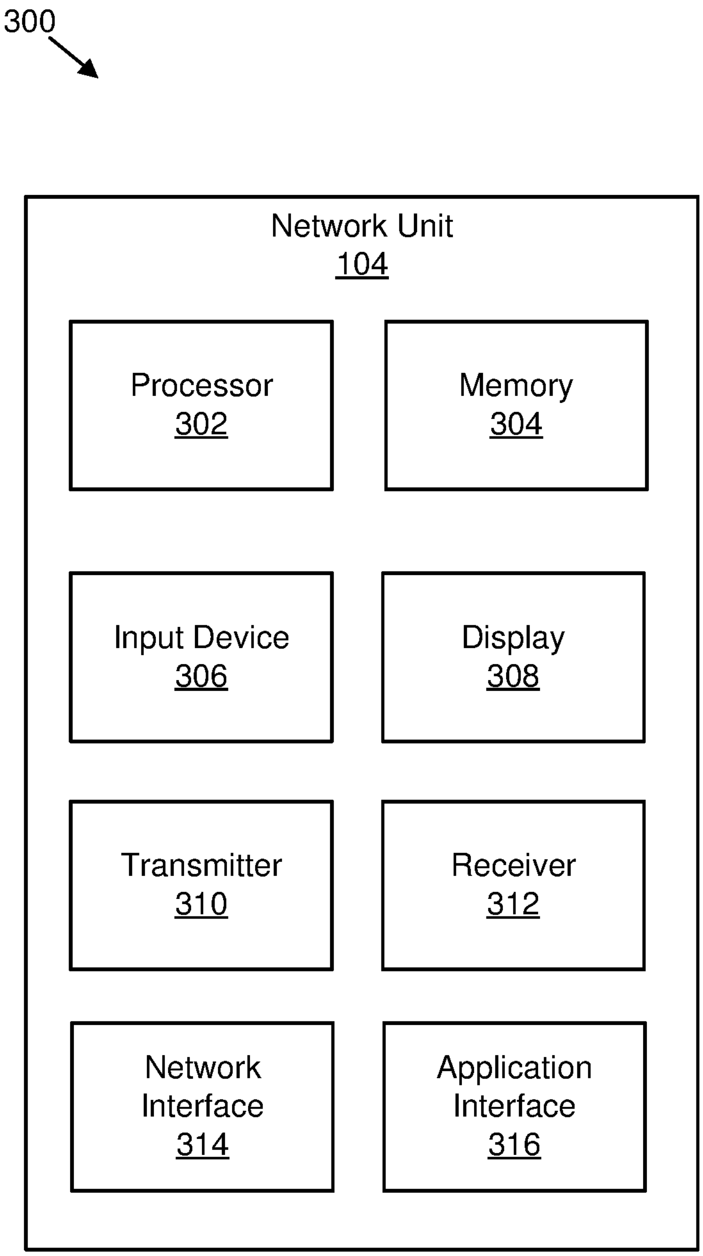
FIG. 3 is a schematic block diagram illustrating one embodiment of an apparatus that may be used for determining application data and/or analytics.

FIG. 3 depicts one embodiment of an apparatus 300 that may be used for determining application data and/or analytics. The apparatus 300 includes one embodiment of the network unit 104. Furthermore, the network unit 104 may include a processor 302, a memory 304, an input device 306, a display 308, a transmitter 310, a receiver 312, a network interface 314, and an application interface 316. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively. The network interface 314 (e.g., one or more network interfaces) may support 3GPP reference points such as Uu, N1, N2, N3, N33, and N5. Other network interfaces may be supported as understood by one of ordinary skill in the art. The application interface 316 (e.g., one or more application interfaces) may support 3GPP northbound APIs.

In certain embodiments, the processor 302: associates an application data analytics event with a combination of a plurality of data collection events and a plurality of network data analytics events based on an application request for end-to-end application related performance analytics; obtains a first set of data from a plurality of data producing entities, data analytics producing entities, or a combination thereof based on the application data analytics event; configures a second set of data based on the first set of data, wherein the second set of data comprises at least a portion of the first set of data, an abstraction of the first set of data, or a combination thereof based on the application data analytics event; and derives application data analytics corresponding to the application data analytics event based on the second set of data.

In some embodiments, the receiver 312 receives a request from an application enablement entity. In various embodiments, the processor 302 determines local user equipment data, analytics, or a combination thereof in response to receiving the request from the application enablement entity. In certain embodiments, the transmitter 310 transmits the local user equipment data, analytics, or the combination thereof to the application enablement entity.

In certain embodiments, application layer performance analytics may be provided to a vertical application and/or application service provider ("ASP") based on network-layer and/or application layer data collection over a user plane.

In some embodiments, data analytics services are provided by a network data analytics function ("NWDAF") and may facilitate supporting network data analytics services in a fifth generation ("5G") core network. The NWDAF may collect data from other network functions ("NFs"), application functions ("AF"), and/or operation administration and management ("OAM") functions and may be exposed to a third ("3$^{rd}$") party application function to provide stats and predictions related to a slice load level, an observed service experience, an NF load, a network performance, user equipment ("UE") related analytics (e.g., mobility, communication), user data congestion, quality of service ("QoS") sustainability, data network ("DN") performance, and/or other information and/or functions.

In various embodiments, such as in vertical scenarios, data analysis in addition to a 5G system ("5GS") may be needed to provide a useful output to an application specific layer for an end-to-end application service (e.g., including application server related and application session related stats and/or predictions). In such embodiments, stats and/or predictions may be supported and/or enhanced by collecting data from different domains based on a consumer needs. The collection may be from the 5GS via northbound application programming interfaces ("APIs") (e.g., NWDAF, management domain analytics service ("MDAS")), or from an application specific layer and/or DN (e.g., data may be related to collecting high definition ("HD") maps, camera feeds, sensor data, data related to edge and/or cloud resources, data related to application server status (e.g., load of edge application server ("EAS") and/or application server ("AS")), or data from the UE side (e.g., UE routes and/or trajectories)). Moreover, application data collection may be provided by different sources (e.g., vertical specific server, application of the UE, EAS, 3rd party server, service enabler architecture layer ("SEAL")) and it may be identified how the data may be collected to enable for stats and/or predictions by an analytics enablement layer.

In certain embodiments, use of a network layer and/or protocol data unit ("PDU") layer measurement on application sessions (e.g., of certain types and certain time of the day and/or area) may be beneficial for generating stats and/predictions that indicate expected and/or predicted DN performance and/or failures or expected and/or predicted application QoS possible degradation or sustainability.

Embodiments herein may facilitate: collection of data from a user plane by a UE or a DN for performing application layer data analytics, using collected data and/or deriving application data analytics services at an analytics enabler layer and exposing them to a vertical device and/or ASP.

In some embodiments, analytics are provided from a 5G core network ("5GC") perspective as well as from an OAM perspective.

In various embodiments, certain entities may be defined such as an NWDAF, a data collection coordination function ("DCCF"), and an analytics data repository function ("ADRF").

In certain embodiments, in an NWDAF, main analytics services may include collecting data from user plane sessions (e.g., from UPF and/or AF) such as: 1) observed service experience related network data analytics that may include: service experience for a UE, a group UEs, and/or any UE in an application or a set of applications over a specific user plane ("UP") path (e.g., UPF, data network access identifier ("DNAI"), and/or edge cloud ("EC") server)—the inputs may be from an AF, NFs, and/or an OAM (e.g., from the UPF the inputs may include: a QoS flow bit rate, a QoS flow packet delay, a number of packet transmissions ("TX") and/or re-TX, from the AF the inputs may include: quality of experience ("QoE") metrics, service experience, app location); 2) wireless local area network ("WLAN") performance analytics (e.g., UE uplink ("UL") and/or downlink ("DL") data rate and traffic volume); 3) UE communication analytics (e.g., NWDAF collects UE UL and/or DL data rate and traffic volume from UPF and N4 session level data); 4) user data congestion analytics (e.g., NWDAF gets from UPF or AF: UL and/or DL throughput and peak UL and/or DL throughput); 5) redundant transmission experience related analytics (e.g., UL and/or DL packet delay from UE to UPF); and/or 6) DN performance analytics (e.g., performance data from AF such as average packet delay, average loss rate, and/or throughput).

In some embodiments, in a DCCF, data collection coordination and delivery may coordinate the collection and distribution of data requested by NF consumers. Data collection coordination may be supported by the DCCF. Data consumers may send request for data to the DCCF rather than directly to an NF data source.

In various embodiments, an ADRF stores historical data and/or analytics (e.g., data and/or analytics related to a past time period that has been obtained by a consumer. After the consumer obtains data and/or analytics, the consumer may store historical data and/or analytics in the ADRF. Whether the consumer directly contacts the ADRF, goes via the DCCF, or via the messaging framework may be based on a configuration.

In certain embodiments, a management data analytics service ("MDAS") provides data analytics of different network related parameters (e.g., including load level and/or resource utilization). For example, the MDAS for a NF may collect the NF's load related performance data (e.g., resource usage status of the NF). The analysis of the collected data may be per area, slice, and/or slice subnet, and may provide forecast of resource usage information in a predefined future time. This analysis may also recommend appropriate actions (e.g., scaling of resources, admission control, load balancing of traffic, and so forth).

In various embodiments, a NWDAF and/or an MDAS don't provide analytics services for application related parameters (e.g., 1) application e2e performance considering data from UE, edge, Afs; 2) application related performance analytics if a side link is used for communication; 3) edge related analytics; and/or 4) application session related analytics based on real-time UE measurements).

In certain embodiments, it may be determined how to provide application layer performance analytics related to an application session or performance for a vertical application and/or ASP based on a network-layer (e.g., edge and application layer data collection over a user plane).

In various embodiments, stats and/or predictions related to a DN and/or application session QoS may be provided to a vertical and/or ASP. Such embodiments may use: 1) an application data analytics enabler function ("ADAEF") which may have a server and a client counterpart at a DN and UE accordingly (e.g., application data analytics enabler server ("ADAES") and application data analytics enabler client ("ADAEC"))—the ADAEF collects data from the ADCCF and produces analytics based on vertical and/or ASP requirements—the server side of the ADAEF may be seen as an AF which may consume northbound NEF and OAM services, and the client side of ADAEF may collect day from a local application DCCF ("L-ADCCF") at the UE and provide these to the ADAES based on the configuration of the reporting; 2) a data producer or a data collection coordination function which coordinates collection from multiple data producers; and/or 3) an ADRF may be assumed to store analytics provided by the ADAEF (e.g., it may be possible that storage of such data is within a vertical application layer ("VAL") database ("DB")).

Figure 4:
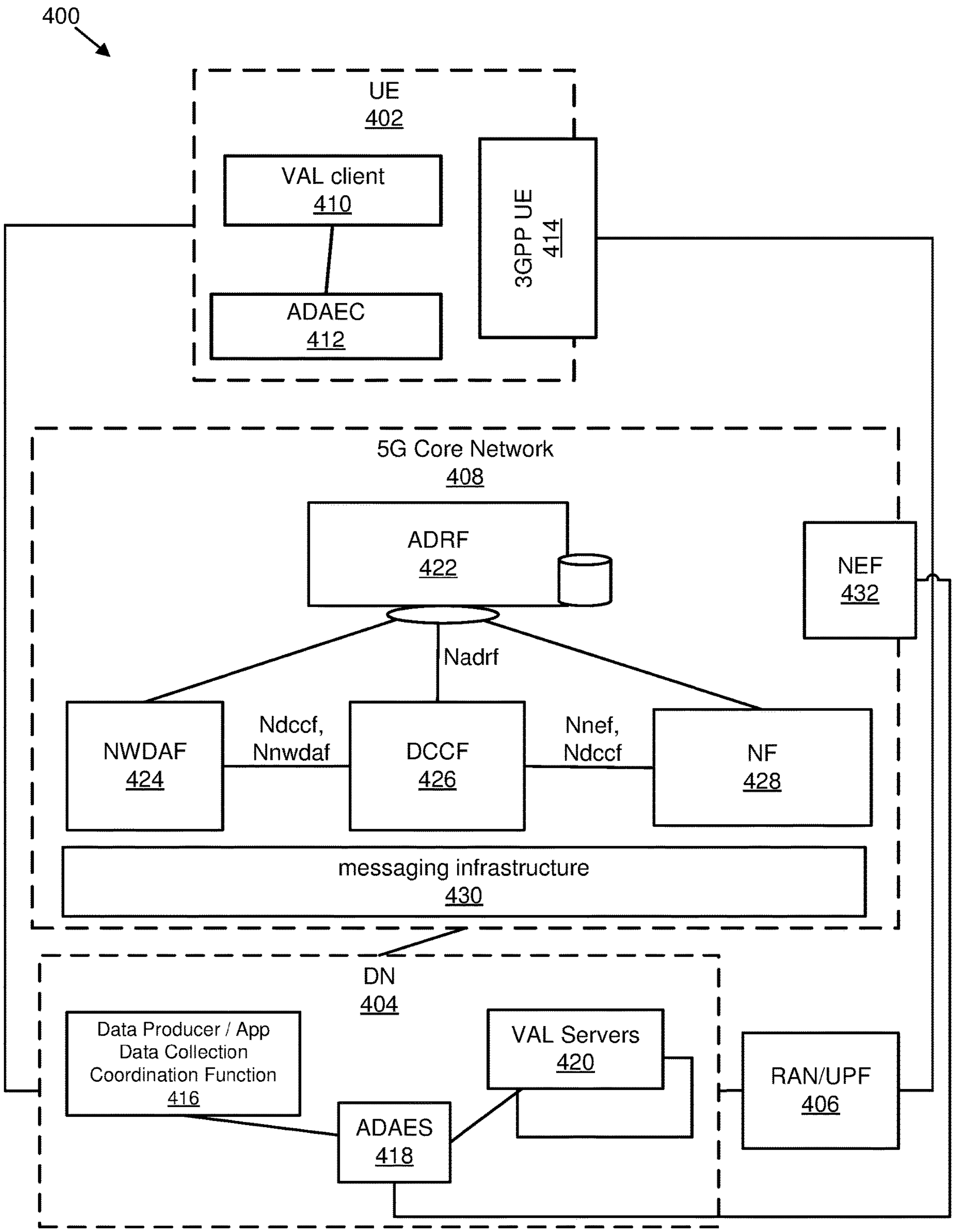
FIG. 4 is a schematic block diagram illustrating one embodiment of a system for determining application data and/or analytics.

FIG. 4 is a schematic block diagram illustrating one embodiment of a system 400 for determining application data and/or analytics. The system 400 includes a UE 402, a DN 404, a RAN and/or UPF 406, and a 5G core network 408. The UE 402 includes a VAL client 410, an ADAEC 412, and a 3GPP UE 414. Moreover, the DN 404 includes a data producer and/or application data collection coordination function ("ADCCF") 416, an ADAES 418, and one or more VAL servers 420. Further, the 5G core network 408 includes an ADRF 422, an NWDAF 424, a DCCF 426, an NF 428, a messaging infrastructure 430, and an NEF 432. ADCCF may be defined as a DCCF residing at the application layer. ADCCF may include a global application data collection coordination function ("G-ADCCF") residing at a data network side which monitors application session data (e.g., from the PDU layer) as well as historical data on the data network and/or application server performance, and may also coordinate the collection from the network side. An L-ADCCF can be a client counterpart of the G-ADCCF that resides in the UE. The L-ADCCF client collects data from both on-network and off-network sessions and optionally abstracts this data based on external entity needs.

In certain embodiments, an application analytics consumer (e.g., one or more VAL server 420, an edge application server, or a network function) subscribes for the ADAES 418 for an application data analytics event. An application data analytics event requested may be one of the following: 1) event 1: application session performance stats and/or predictions (e.g., metrics may be a predicted round trip time ("RTT") for a session, jitter, throughput, packet error rate ("PER"), and so forth); 2) event 2: application server performance stats and/or predictions (e.g., metrics may be the predicted RTT for the server, jitter, average and peak throughput, PER, load of the server, number of connections, northbound API load, N6 interface load and/or conditions, and so forth); 3) event 3: application server and/or session performance stats and/or predictions for a given slice (e.g., an application server may relocate so it may be useful to know expected performance at a target data network node ("DNN") and/or slice); 4) event 4: application server, session stats, and/or predicted performance for a given radio access technology ("RAT") or access type.

The ADAES 418 determines an association of the analytics event received with data collection event identifiers ("IDs") and data producer IDs that are needed. This association may include a mapping of analytics event IDs to a mixture of data collection events and data analytics events from the NWDAF 424 and/or MDAS. This mapping may be pre-configured or configured at the ADAES 418 per application and/or vertical requirement for data collection and/or analytics. The ADAES 418 subscribes to the data and/or analytics producers based on the event ID (or subscribes to a data collection coordination function to receive data based on the analytics ID and/or name on behalf of the producers). For the subscription to the data producers, the event ID may be the same as the analytics ID or it may be data collection event ID for the data to be collected. For an analytics ID, at subscription, the ADAES 418 provides the mapping of the analytics ID to the data to be collected for that ID.

Example data producers (e.g., if ADCCF 416 is not used) may be the following per event: 1) event 1: target UE, NEF 432 and/or NWDAF 424, OAM, SEAL location management server ("LMS") and/or location management function ("LMF"); 2) event 2: VAL server, edge platform, NEF 432 and/or NWDAF 424, OAM, SEAL LMS and/or LMF, seal data delivery ("SEALDD"); 3) event 3: the same as event 1 and 2 plus SEAL and/or network slice capability enablement ("NSCE") server; and/or 4) event 4: the same as event 1 and 2 plus SMF and/or PCF and RAN node.

In some embodiments, after determining the association, a level of abstraction or processing for data to be collected per analytics event ID or per data collection event ID may be configured based on an application profile and/or vertical and key performance indicators ("KPIs") for an application service. It may be identified whether the analytics need to be provided on-line (e.g., while the application session is running) and/or offline (e.g., before a session starts to identify the predicted performance). A level of abstraction may refer to whether data is raw of processing and/or a level of processing. Processing may mean that data may be averaged, filtered, and/or combined with other data for a given area, time, and/or type of request. For example, all RTT data for a given time and area (e.g., hotspot area at peak hours) may be provided but for non-peak hours (e.g., when it is not needed or when a communication load is high)) may provide only an average RTT value. This may affect a data analysis confidence level (e.g., since everything depends on the data sampling); however, in certain scenarios this may not affect performance. In some embodiments, there may be a determination of what composition and/or aggregation of data corresponding to different segments contributing to an end to end application service is required (e.g., if some data applies to different segments of an application session such as RAN, core network ("CN"), transport network ("TN"), edge platform).

The data producers 416 (e.g., or a data collection coordination function if it is used for the data collection coordination) sends data to the ADAES 418 per analytics event ID and/or per data collection and/or analytics event ID. If a data collection coordination function 416 is used, an abstraction of the data may be provided to the ADAES 418 instead of the data producers. Such data may include: 1) measurements from an application layer (enabler layer or specific layer) based on the real-time performance of the application session (e.g., application traffic is passed via the SEALDD client at the UE, this may include the packet losses, number of message retransmissions, the experienced latency and failures); 2) UE trajectories and/or routes; 3) edge related: edge and/or cloud load measurements, edge server load and/or conditions, number of API invocations for a given area and time, edge service availability stats, number of completed transactions, edge platform and/or service failure rates, edge service uptime and/or downtime stats, cached application data; 4) application traffic parameters (e.g., time schedules) for the application session; 5) per slice measurements (e.g., if slice enabler client knows the slice to which the UE is connected to it may gather measurements per slice—this may help to get stats per slice for future selections and/or preference setting); 6) performance measurements from networking layers and/or PDU layer at the UE side; 7) measurements from an access stratum (e.g., L2 measurement); 8) per RAT and/or interface measurements (e.g., measurements from the application layer or networking layer based on the type of communication such as UE to UE interface ("PC5"), UE to network interface ("Uu")); 9) per public land mobile network ("PLMN") measurements (e.g., the UE may connect to multiple PLMNs for a multi-operator service); 10) networking layers (e.g., transmission control protocol ("TCP"), quick user datagram protocol ("UDP") internet connection ("QUIC"), internet protocol ("IP"), and/or Ethernet): based on the transport protocols used—such data may include RTT and/or delay and loss rates; 11) NF measurements (e.g., location reports from LMF, session management data from SMF, provisioning parameters from PCF); 12) NWDAF analytics including: DN performance analytics, UE communication analytics, user data congestion analytics, network, or slice load and/or congestion analytics; and/or 13) OAM performance management ("PM") and/or fault management ("FM") data.

The ADAES 418 (e.g., with the optional support of the other application enablement entities) optionally performs a composition and/or aggregation of data corresponding to different segments contributing to the end to end application service (e.g., based on a configuration), where the segments include one or more Ues, a radio access network, a transport network, a core network, a data network, an edge platform, a middleware, a networking stack, a communication interface, and/or an API. In various embodiments, data received from a RAN and/or radio network information service ("RNIS") on RAN latency, data received from CN on UPF latency, data received from UE and edge platform (e.g., processing latencies) are aggregated to generate a data sample for the end to end latency.

The ADAES 418 derives stats and/or predictions for the analytics event ID (e.g., based on a subscription) based on data received and an analytics method to be used (e.g., regression, artificial intelligence ("AI") and/or machine language ("ML") methods). Such analytics may include stats or predictions for a particular area and/or time or conditional to some events and/or thresholds. For different analytics event IDs, different analytics methods may be used.

In certain embodiments: 1) for event 1: real-time application session parameters from networking stack at the UE, measurements from the VAL server and/or SEALDD server on the ongoing application session, PM data, location of UE or predicted location or expected route of the UE, NWDAF analytics on UE communication and congestion, QoS sustainability from NWDAF; 2) for event 2: measurements from the VAL server and/or SEALDD server on the VAL server performance, measurement of all ongoing application session served by VAL server, PM data, NWDAF analytics on DN performance, network exposure function ("NEF") monitoring of network status, edge measurement on an enhanced data network ("EDN") load and/or performance and edge API load and/or conditions; 3) for event 3: the same as in event 1 and 2 plus NWDAF analytics on a slice load, PM data for the given slice, management domain analytics per slice, and slice subnets; 4) for event 4: the same as in event 1 and 2 plus real time UE data per RAT and/or interface, offline stats per RAT and/or interface, RAN performance data for UL, DL, and/or sidelink ("SL") from OAM or from RAN (if such exposure is supported), data from RAN intelligent controller ("RIC") (e.g., if deployed at the edge platform) on the RAN performance and/or analytics.

It should be noted that open RAN ("O-RAN") is an alliance that investigates a virtualization of access domain and considers virtualization of control functionalities (e.g., self organizing network ("SON") and/or radio resource management ("RRM")) to a RIC which may co-located with a gNB, may be deployed for a cluster of gNBs, or may be deployed at an edge node.

The RIC consists two different entities: 1) non-Real Time ("RT") RIC: a logical function that enables non-real-time control and optimization of RAN elements and resources, AI and/or ML workflow including model training and updates, and policy-based guidance of applications and/or features in Near-RT RIC; and 2) near-RT RIC: a logical function that enables near-real-time control and optimization of RAN elements and resources via fine-grained (e.g., UE basis, cell basis) data collection and actions over E2 interface.

RIC as a data producer may provide data or analytics related to the RAN performance for the set of cells within the application server service area. Such performance data or analytics may relate to radio bearer conditions, radio channel performance, RAN slice performance, UE-related RAN performance, cell switching and/or traffic steering events for one or more Ues, and/or RRM and/or SON outputs.

The ADAES 418 may request analytics from ADAEC 412 based on local analytics at the UE 402 to improve the analytics confidence level for a given analytics event ID. In certain embodiments, the ADAES 418 may configure the ADAEC 412 with information for reporting analytics, a metric required, thresholds per analytics event ID, and/or a mapping to local data collection event IDs for the analytics ID.

The ADAEC 412 provides local data analytics for the UE 402 (e.g., based on the analytics ID or the data collection ID which may be provided in advance to the ADAEC 412) based on collecting and/or listening to local UE 402 data from the application clients and/or VAL clients 410, or from the PDU layer or from AS and/or non-access stratum ("NAS") layer. The ADAEC 412 may filter analytics per interface used (e.g., Uu, PC5) or per RAT used (e.g., LTE, NR) and it may also provide analytics for other Ues dependent to this UE 402 (e.g., if this UE 402 is a group lead in group based communications) which may be derived via data collected over sidelink. For example, for vehicle to everything ("V2X"), the ADAEC 412 may analyze data based on cooperative awareness messages ("CAM") (e.g., locations of other Ues), channel busy rate ("CBR") measurements for a given area and/or time, physical downlink shared channel ("PDSCH") rate matching and quasi-co-location indicator ("PQI") load and/or range values for side-link communications.

The ADAES 418 performs further analytics for the requested analytics event ID taking as inputs the ADAEC 412 provided analytics. For ML-based analytics, this may be seen as an ML model inference using local UE data. If the confidence level is acceptable, the ADAES 418 exposes analytics to the consumer (e.g., VAL server 420). The ADAES 418 may store the produced analytics with the ADRF 422.

In certain embodiments, interactions between entities in FIG. 4 may include: 1) data collection API from G-ADCCF to ADAES 418; 2) data analytics API from ADAES 418 to VAL server 420; 3) data storage API to ADRF 422 from G-ADCCF; 4) data analytics storage API to ADRF 422 from ADAES 418; 5) local data collection API from L-ADCCF to ADAEC 412; and/or 6) local UE data analytics collection API from ADAEC 412 to ADAES 418.

Figure 5A:
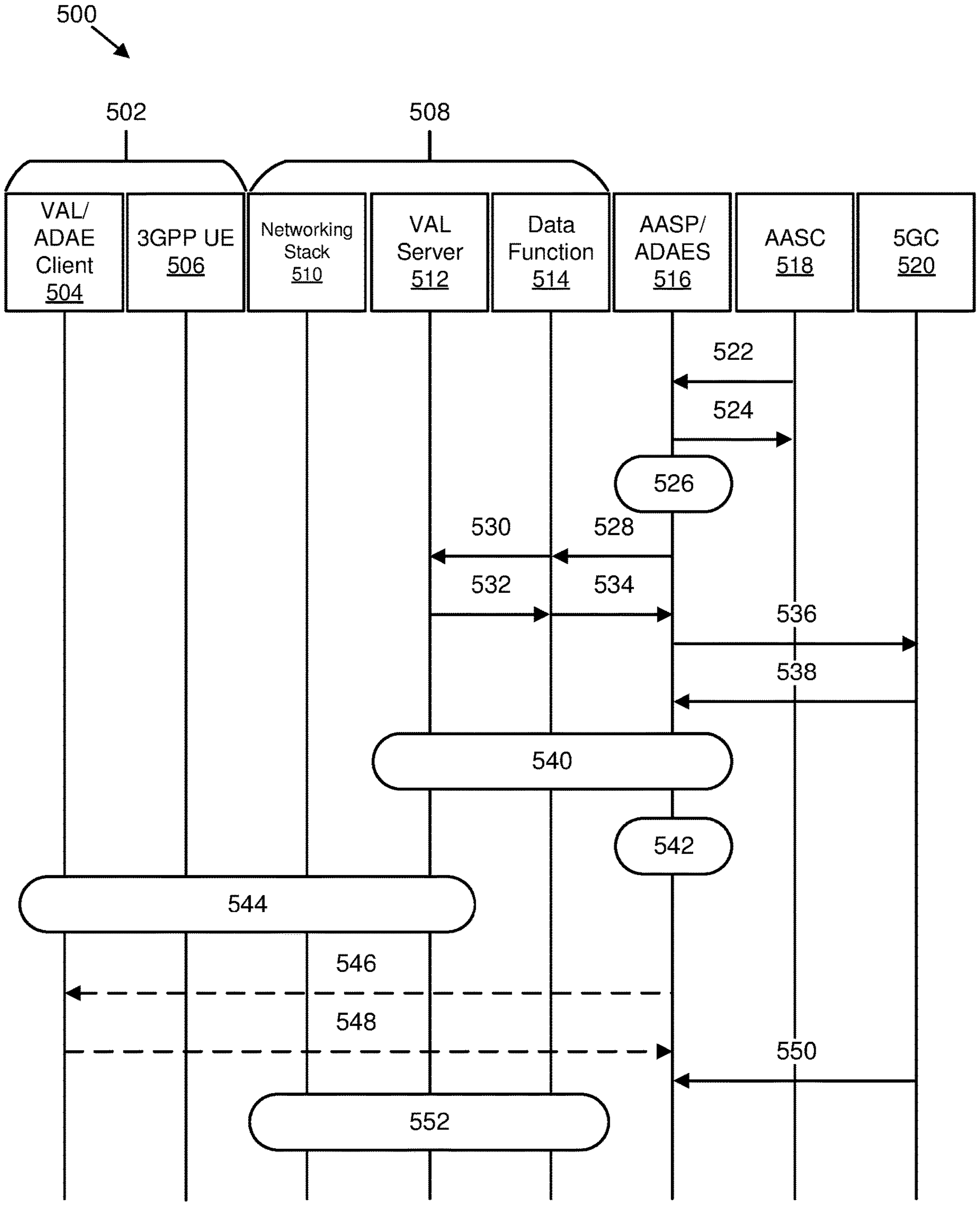
FIGS. 5A and 5B are schematic block diagrams illustrating one embodiment of communications in a system for determining application data and/or analytics.
Figure 5B:
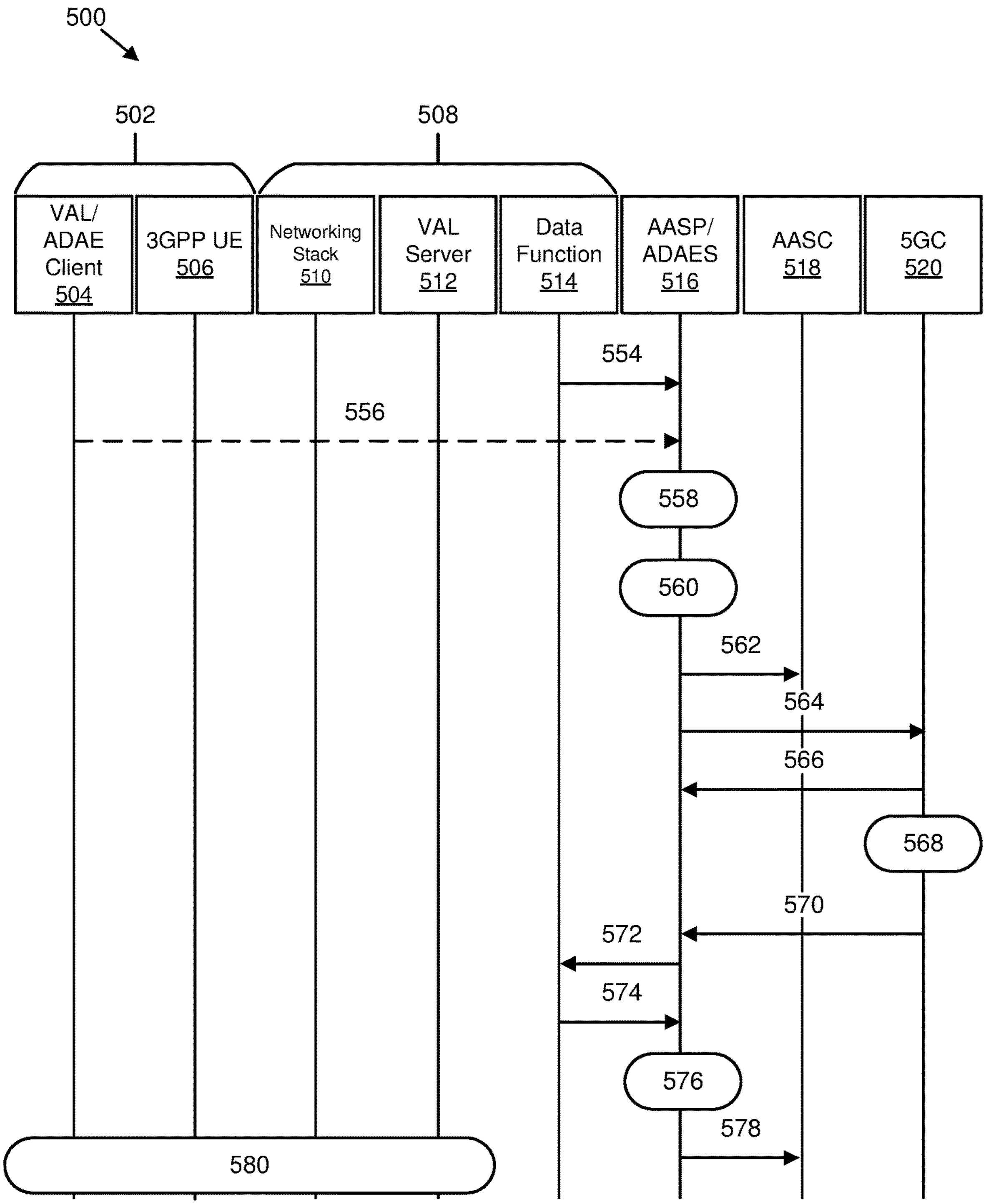
Figure 6A:
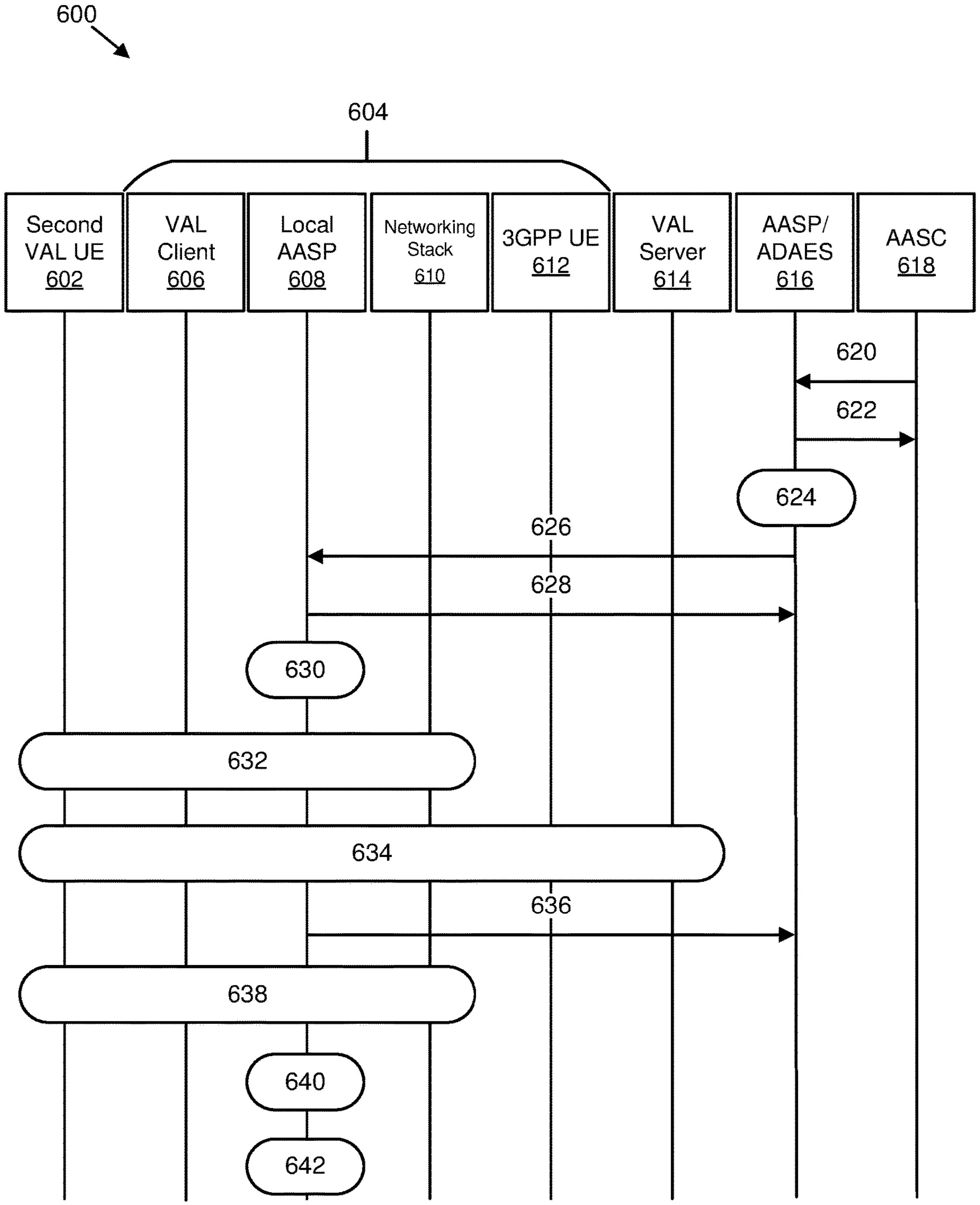
FIGS. 6A and 6B are schematic block diagrams illustrating another embodiment of communications in a system for determining application data and/or analytics.

In various embodiments, to capture mapping of entities with a 3GPP architecture, the following may provide information corresponding to FIGS. 5A, 5B, 6A, and/or 6B: 1) SEALDD layer: the SEAL data delivery client interacts with the SEAL data delivery server to establish application layer data transport path-SEALDD server and client provide data transport service capabilities such as data plane packet processing (e.g., packet duplication, elimination, and/or transport coordination), data forwarding, data caching, background data transfer, and so forth to support a VAL server and client; 2) analytics enabler server and client may be two entities to be defined and may mapped to an ADAEC and ADAES accordingly; and/or 3) a VAL layer is the application specific layer (e.g., vertical application server and/or client, gaming application server and/or client, edge application server and/or client, and so forth). The VAL database ("DB") may be a functional entity that contains information of a user profile associated with a VAL service that is served by the VAL service provider at the application plane.

It should be noted that embodiments herein may correspond to: 1) data analytics about one or more server performance predictions; and/or 2) data analytics for an application session performance prediction and/or sustainability.

In a first embodiment, there may be data analytics corresponding to server performance from a network side.

FIGS. 5A and 5B are schematic block diagrams illustrating one embodiment of communications in a system 500 for determining application data and/or analytics. The system 500 includes a VAL UE 502 that includes a VAL and/or application data analytics enabler ("ADAE") client 504 and a 3GPP UE 506. Moreover, the system 500 includes an edge cloud platform 508 which includes a networking stack 510 (e.g., TCP, QUIC, and/or IP), a VAL server 512, and a data function 514 (e.g., data producer and/or data collection coordination function). Further, the system 500 includes an application analytics service producer ("AASP") 516 (e.g., analytics enabler server, ADAES), an application analytics service consumer ("AASC") 518 (e.g., VAL server, VAL client, EAS, NWDAF, and/or other NF), and a 5GC 520 (e.g., SMF, PCF, NWDAF, SEAL).

In a first communication 522, the consumer of the analytics service (e.g., AASC 518) sends a subscription request to ADAES (e.g., AASP 516) and provides the analytics event ID (e.g., may be any event described herein), the target VAL server ID, the time validity and area of the request, the required confidence level, the permissions and/or subscriptions over the 5GS services, whether offline and/or online analytics are needed, an exposure level and/or constraints for analytics.

In a second communication 524, the ADAES (e.g., AASP 516) sends a subscription response as an ACK to the AASC 518 (e.g., this may be done alternatively after step 534).

The ADAES (e.g., AASP 516) maps 526 the analytics event ID to a list of data collection event identifiers, network and/or management data analytics event IDs, and/or a list of data producer IDs. Such mapping may be preconfigured by an OAM or may be configured at the ADAES based on the analytics event type and/or vertical type. In step 526, if there is a combination and/or abstraction of data, the ADAES provides a configuration for data aggregation processing.

In a third communication 528 and/or a fourth communication 530, the ADAES sends a subscription request to the data producers (e.g., data function 514 and/or VAL server 512) with a respective data collection event ID (or the analytics event ID if they already know the mapping) and a requirement for data collection. Messages may include the data collection event ID and/or the analytics event ID (e.g., may be one of the events described herein), the target VAL server ID, the ADAES ID, the time validity and area of the request, the required confidence level, the permissions and/or subscriptions of VAL server and/or ADAES over the 5GS services.

In some embodiments, if a data collection coordination function (e.g., ADCCF) is collecting data for the respective data producers, the ADAES sends the request to the ADCCF including a list of data producers and a level of data abstraction required.

In a fifth communication 532 and/or a sixth communication 534, the data producers (e.g., data function 514 and/or VAL server 512 (or ADCCF) sends a subscription response as an ACK to the ADAES (e.g., based on the exposure level).

In a seventh communication 536 and/or an eighth communication 538, the ADAES may subscribe to the 5GC 520 (e.g., NEF, SMF, PCF, and/or NWDAF) to monitor a network, a UE situation, or network data analytics required for an application data analytics event.

In a nineth communication 540, the ADAES, based on the subscription to data producers, may receive offline stats and/or data about the VAL server performance based on the analytics and/or data collection event ID. Such offline data may include throughput, e2e delay, jitter, PER, availability, server load, number of failed transactions, and so forth and may be for a given area and time of the day (e.g., based on the time and/or area of the request). For analytics events related to slicing, PLMN, RAT, and/or interface, data is filtered and/or sent only for a specific slice, RAT, PLMN, and/or interface (e.g., part of the first set of data).

The ADAES (e.g., additionally or as an alternative to step 540) may fetch 542 offline data analytics which were stored previously in the ADRF (or an external database which aims to keep the offline analytics) (e.g., part of the first set of data). In various embodiments, in a tenth communication 544, a session starts between the VAL server 512 and a UE (e.g., this may happen for more than one Ues).

In an optional eleventh communication 546 and/or an optional twelfth communication 548, the ADAES optionally subscribes to the ADAEC and/or VAL client at the UE side to request analytics or data from the UE side about the ongoing session (e.g., based on the data analytics or data collection event ID).

In a thirteenth communication 550, the ADAES may also receive NWDAF analytics based on the subscription and the configuration of network analytics event for the application layer analytics event (e.g., this is part of the first set of data).

In a fourteenth communication 552, the data producer or ADCCF starts collecting and/or listening to real-time networking or application data (e.g., from networking start at DN or VAL server itself—such data may be the RTT, the PER, throughput, and so forth).

In a fifteenth communication 554, the data producer or ADCCF abstracts (e.g., filters and/or formats) and sends the real-time data corresponding the to the data collection ID or the analytics event ID for which the ADAES subscribed (e.g., this is part of the first set of data).

In an optional sixteenth communication 556, the ADAES may receive data and/or analytics from the application of the UE within the ongoing session. Such data may be about the RTT, throughput, jitter, QoE, QoS profile load, L2 measurement, and so forth (e.g., this is part of the first set of data).

The ADAES abstracts 558 or correlates the data based on the analytics event and the data collection configuration. Such data may have been received in other steps. Such correlation may include filtering of data for the same metrics but with different granularities, or combine and/or aggregate data of segments of an end to end path. The outcome may be an abstracted, correlated, and/or filtered set of data (e.g., this is the second set of data).

The ADAES derives 560 application layer online analytics on the VAL server 512 performance based on the first and/or the second set of data and based on the analytics ID and type of request (e.g., request of the consumer may indicate whether offline and/or online analytics are needed). Such analytics can be stats or predictions for a given area and/or time and based on the event type for a given slice, PLMN, RAT, and/or interface. The analytics may be done based on regression or other means (e.g., ML).

In a seventeenth communication 562, the ADAES sends the online analytics to the consumer based on an exposure level (e.g., if needed based on the analytics event subscription).

In an eighteenth communication 564, a nineteenth communication 566, a step 568, and a twentieth communication 570, the ADAES may receive a trigger event indicating a UE location change or a network degradation indication (or predictive metric, like QoS sustainability analytics from NWDAF). This can be based on a subscription.

In a twenty-first communication 572, the ADAES, in response of steps 564, 566, 568, and 570, sends a request for further data from the data producers and/or ADCCF for the VAL server 512 performance (e.g., from the ongoing session).

In a twenty-second communication 574, the data producer or ADCCF abstracts (e.g., filters and/or formats) and sends real-time data corresponding the data collection ID or the analytics event ID for which the ADAES subscribed.

As may be appreciated, steps 576, 578, and 580 may be similar to steps 558, 560, and/or 562.

In a second embodiment, there may be analytics for application session performance from a UE side. In the second embodiment, there may be analytics from the UE side for session performance.

Figure 6B:
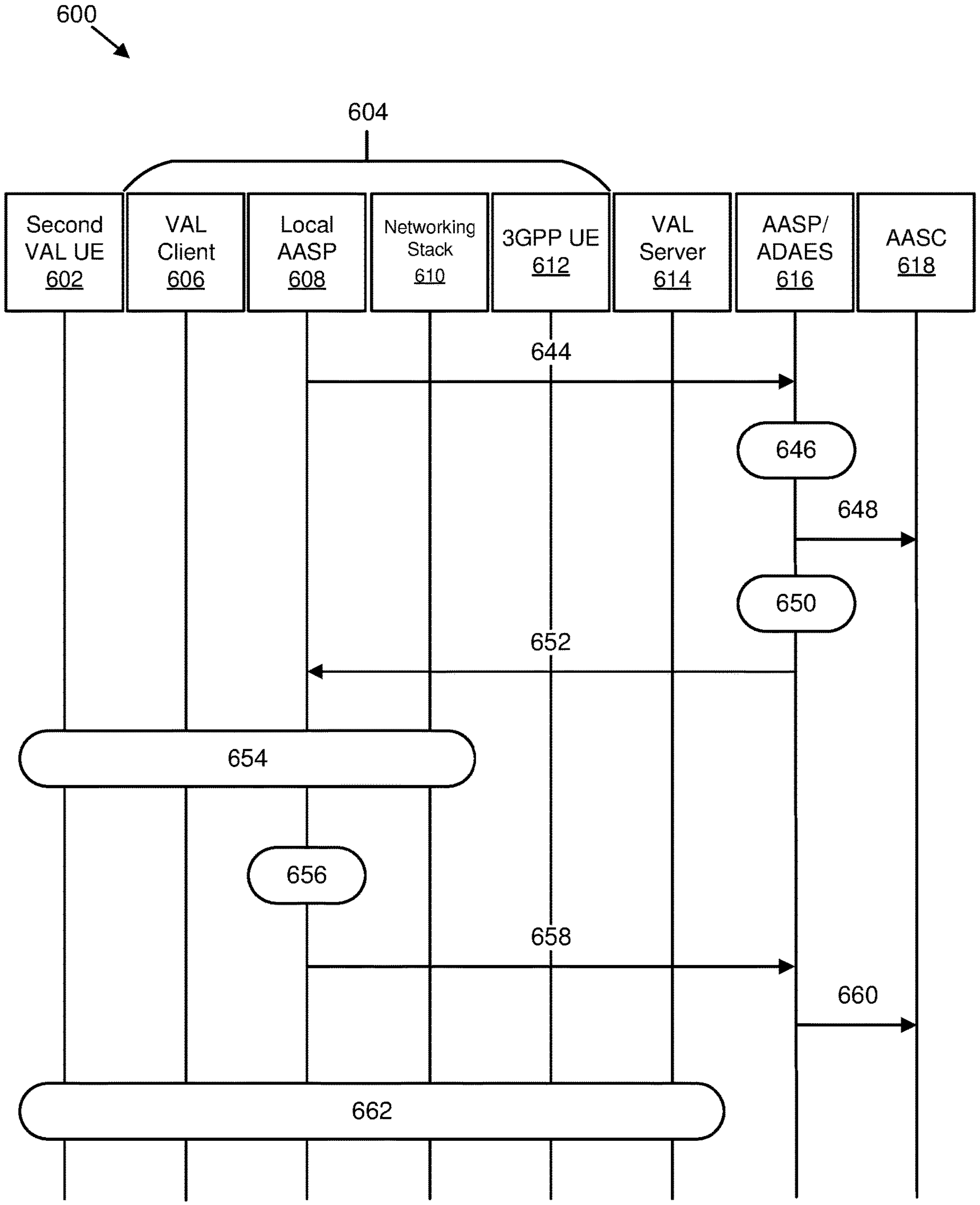

FIGS. 6A and 6B are schematic block diagrams illustrating another embodiment of communications in a system 600 for determining application data and/or analytics. The system 600 includes a second VAL UE 602 and a first VAL UE 604. Moreover, the first VAL UE 604 includes a VAL client 606, a local AASP 608 (e.g., ADAEC), a networking stack 610 (e.g., TCP, QUIC, and/or IP), and a 3GPP UE 612. Moreover, the system 600 includes a VAL server 614, an AASP 616 (e.g., analytics enabler server, ADAES), and an AASC 618 (e.g., VAL server, VAL client, EAS, NWDAF, and/or other NF).

In a first communication 620, the consumer (e.g., AASC 618) of the analytics service sends a subscription request to the AASP 616 (e.g., ADAES) and provides the analytics event ID (e.g., any analytics described herein), the target VAL UE ID, the VAL session ID, VAL server ID, VAL application ID, the time validity and area of the request, the required confidence level, the permissions and/or subscriptions over the 5GS services, whether offline and/or online analytics are needed, an exposure level, and/or constraints for analytics.

In a second communication 622, the ADAES sends a subscription response as an ACK to the ADAES (e.g., this can be done after step 628).

The ADAES finds 624 the corresponding ADAEC of the VAL UE for which the local analytics need to be performed. In certain embodiments, the ADAES maps the analytics event ID to a list of data collection event identifiers and/or a list of data producer IDs. The mapping may be preconfigured by an OAM or may be configured at the ADAES based on the analytics event type and/or vertical type. In this step, if there is a combination and/or abstraction of data, the ADAES provides the configuration for the data aggregation processing required.

In a third communication 626, the ADAES sends a subscription request to the ADAEC with the analytics event ID and optionally the data collection event ID.

In a fourth communication 628, ADAEC sends a subscription response to the ADAES.

The ADAEC maps 630 the analytics event ID to a list of data collection event identifiers and optionally a list of data producer ID (e.g., if this is not provided in step 624). The mapping may be preconfigured by ADAES or an OAM or may be configured at the ADAES based on the analytics event type and/or vertical type.

In a fifth communication 632, the ADAEC subscribes to the VAL clients and/or requests UE local data based on the respective data collection event ID (or the analytics event ID if they already know the mapping). This data may come from the PDU layer of the UE (e.g., via listening the traffic), or via VAL client of one or more Ues (e.g., if an application consists of a group of Ues), or from an AS and/or NAS layer of the UE. In some embodiments, if a local UE data collection coordination function (e.g., L-ADCCF) is collecting data for respective data producers at a UE side, the ADAEC collects the data from that function based on the data collection event ID.

In a sixth communication 634, a session starts between the first VAL UE 604 and the VAL server 614 or between two VAL Ues over PC5.

In a seventh communication 636, the ADAEC (e.g., after being aware from the VAL client that the session started) sends a notification to the ADAES that a session started, and it may be possible to provide real-time data analytics for VAL UE performance in the target area.

In an eighth communication 638, data producers at Ues, L-ADCCF, and/or from other sources (e.g., RAN, RIC) starts collecting and/or listening to real-time networking or application data and sends this to the ADAEC (e.g., from networking stack at the UE, the VAL client, or the UE modem). Such data may be the RTT, the PER, throughput, and so forth (e.g., this may be part of the first set of data).

The ADAEC abstracts 640 or correlates the data based on the analytics event and the data collection configuration. Such correlation may include filtering of data for the same metrics but with different granularities, or be combining and/or aggregating the data of segments of the end to end path. The outcome may be an abstracted, correlated, and/or filtered set of data (e.g., this is the second set of data).

The ADAEC derives 642 application layer online analytics corresponding to the ADAES on the first VAL UE 604 performance, based on the first and/or second set of data, and/or based on the analytics ID and type of request (e.g., request of the consumer may indicate whether offline and/or online analytics are needed). Such analytics may include stats or prediction for a given area and/or time and based on the event type for a given slice, PLMN, RAT, and/or interface. Such analytics may be done based on regression or other means (e.g., ML).

In a nineth communication 644, the ADAES sends the online analytics to the ADAES which is consumer based on an exposure level (e.g., if needed based on the analytics event subscription). It should be noted that further analysis may be possible before sending information to the consumer based on real-time data analytics corresponding to the edge platform or using QoS sustainability analytics from the NWDAF.

In some embodiments, the ADAES, based on received analytics, may perform 646 additional analytics for this event by performing additional steps (e.g., steps 558 and 560 of FIG. 5B).

In a tenth communication 648, the ADAES sends the UE performance analytics to the 3$^{rd}$ party consumer based on an exposure level (e.g., if needed based on the analytics event subscription).

The ADAES may receive 650 or capture a trigger event indicating a UE location change or a network degradation indication (or predictive metric, like QoS sustainability analytics from NWDAF).

In an eleventh communication 652, the ADAES, in response of step 650, sends a request for further data analytics from ADAEC.

As may be appreciated, steps 654, 656, 658, 660, and/or 662 may be similar to steps 640, 642, 644, 446, and/or 648.

Figure 7:
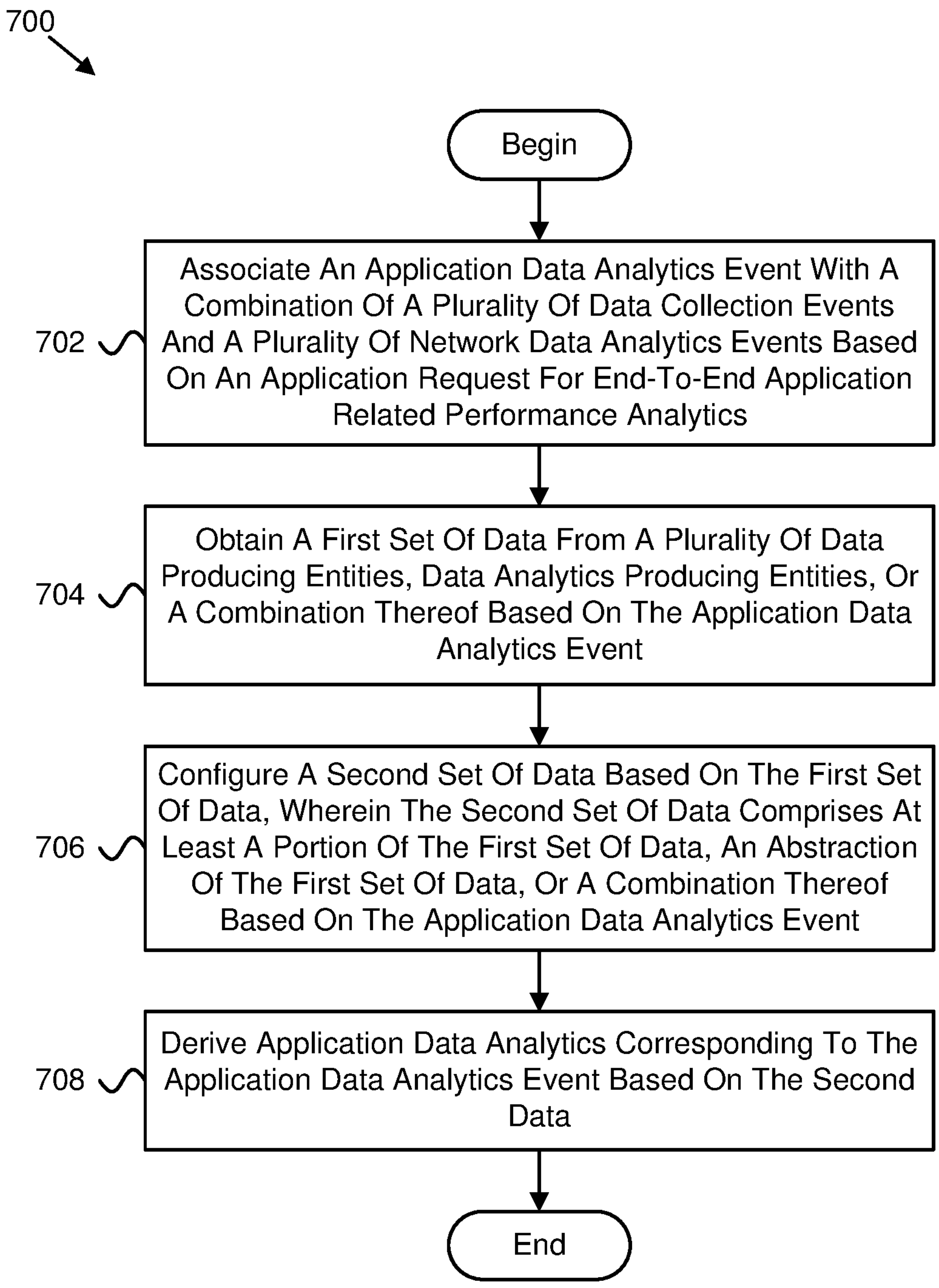
FIG. 7 is a flow chart diagram illustrating one embodiment of a method for determining application data and/or analytics.

FIG. 7 is a flow chart diagram illustrating one embodiment of a method 700 for determining application data and/or analytics. In some embodiments, the method 700 is performed by an apparatus, such as the network unit 104. In certain embodiments, the method 700 may be performed by a processor executing program code, for example, a microcontroller, a microprocessor, a CPU, a GPU, an auxiliary processing unit, a FPGA, or the like.

In various embodiments, the method 700 includes associating 702, at an application enablement unit, an application data analytics event with a combination of a plurality of data collection events and a plurality of network data analytics events based on an application request for end-to-end application related performance analytics. In some embodiments, the method 700 includes obtaining 704 a first set of data from a plurality of data producing entities, data analytics producing entities, or a combination thereof based on the application data analytics event. In certain embodiments, the method 700 includes configuring 706 a second set of data based on the first set of data. The second set of data includes at least a portion of the first set of data, an abstraction of the first set of data, or a combination thereof based on the application data analytics event. In various embodiments, the method 700 includes deriving 708 application data analytics corresponding to the application data analytics event based on the second set of data.

In certain embodiments, the second set of data comprises data corresponding to different segments contributing to an end-to-end application service, wherein the segments comprise at least one user equipment, a radio access network, a transport network, a core network, a data network, an edge platform, a middleware, a networking stack, a communication interface, an application programming interface, or some combination thereof. In some embodiments, the method 700 further comprises receiving a first request from an external application for providing application data analytics corresponding to an end-to-end application service for at least one application. In various embodiments, the method 700 further comprises: configuring an association of the application data analytics event with at least one data collection event; and configuring a mapping of the data collection events to at least one data producer.

In one embodiment, the method 700 further comprises configuring an exposure of the derived application data analytics to an application analytics service consumer based on a vertical application requirement, the application data analytics event, an application service profile, a slice profile, a service level agreement between the application enablement unit and the application data analytics consumer, or some combination thereof. In certain embodiments, the second set of data comprises a combination of data corresponding to different granularities, data producers, or a combination thereof. In some embodiments, the second set of data comprises a filtering of data based on data producer priorities, a data producer reliability, or a combination thereof.

In various embodiments, the second set of data is determined in real time based on real-time measurements from a user plane. In one embodiment, the method 700 further comprises transmitting the derived application data analytics to a vertical application, an application function, an application server, a network function, or some combination thereof, based on the application data analytics event. In certain embodiments, the first set of data, the second set of data, or a combination thereof is determined at a user equipment. In one embodiment, the derived application data analytics comprise a predictive end to end application related performance parameter, and the predictive end to end application related performance parameter comprises: an end-to-end application session performance sustainability indication, an end-to-end application session performance change indication, an end-to-end application server performance sustainability indication, an end-to-end application server performance change indication, or some combination thereof.

In some embodiments, the derived application data analytics are derived at an application enablement client of at least one user equipment. In various embodiments, the application data analytics are derived at an edge platform, a cloud platform, a radio access network intelligent controller, or some combination thereof. In one embodiment, the first set of data comprises: application enabler layer data, control plane data, user plane data, local user equipment data, management plane data, edge platform data, network analytics data, or some combination thereof.

Figure 8:
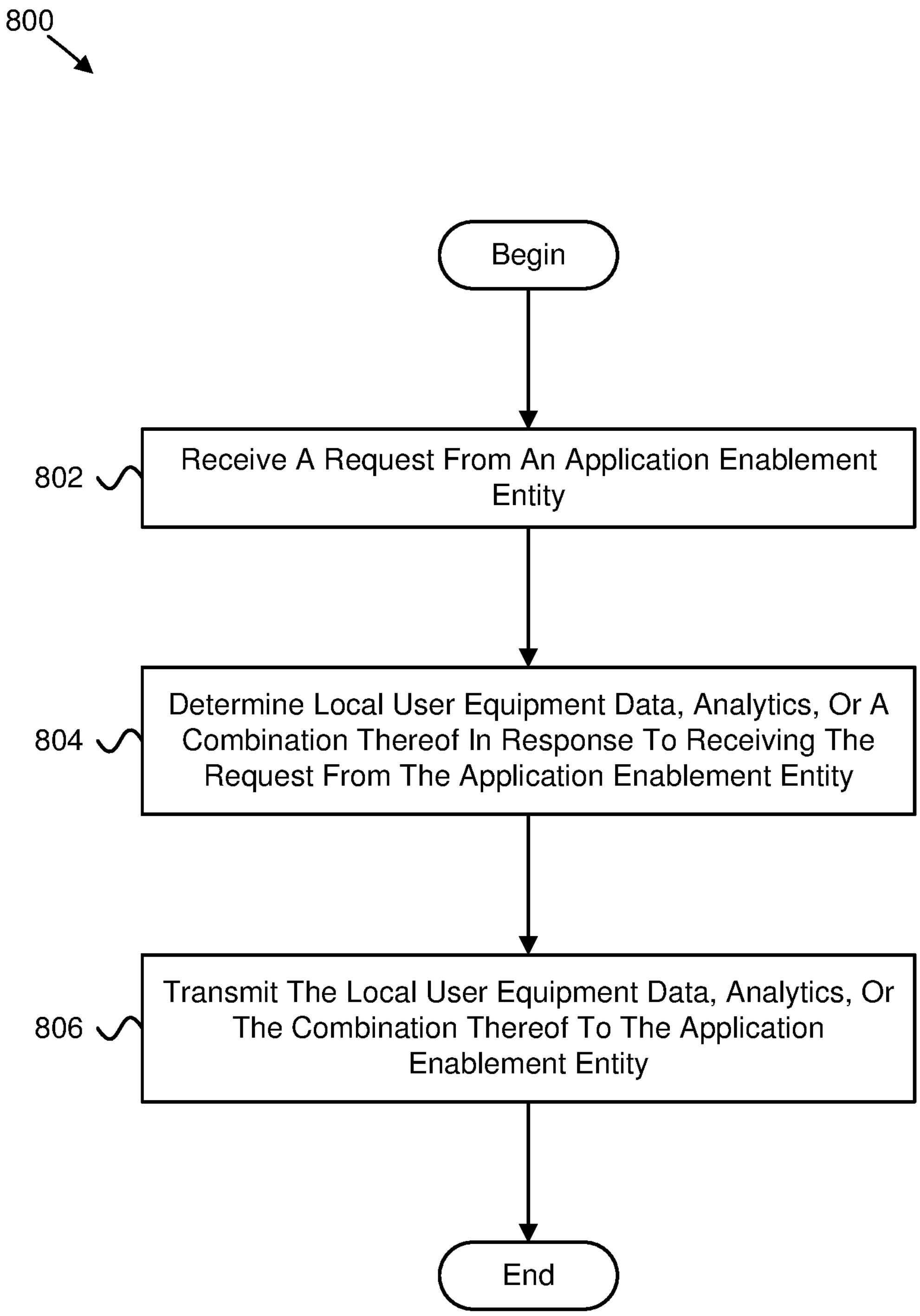
FIG. 8 is a flow chart diagram illustrating another embodiment of a method for determining application data and/or analytics.

FIG. 8 is a flow chart diagram illustrating another embodiment of a method 800 for determining application data and/or analytics. In some embodiments, the method 800 is performed by an apparatus, such as the remote unit 102. In certain embodiments, the method 800 may be performed by a processor executing program code, for example, a microcontroller, a microprocessor, a CPU, a GPU, an auxiliary processing unit, a FPGA, or the like.

In various embodiments, the method 800 includes receiving 802 a request from an application enablement entity. In some embodiments, the method 800 includes determining 804 local user equipment data, analytics, or a combination thereof in response to receiving the request from the application enablement entity. In certain embodiments, the method 800 includes transmitting 806 the local user equipment data, analytics, or the combination thereof to the application enablement entity.

Figure 9:
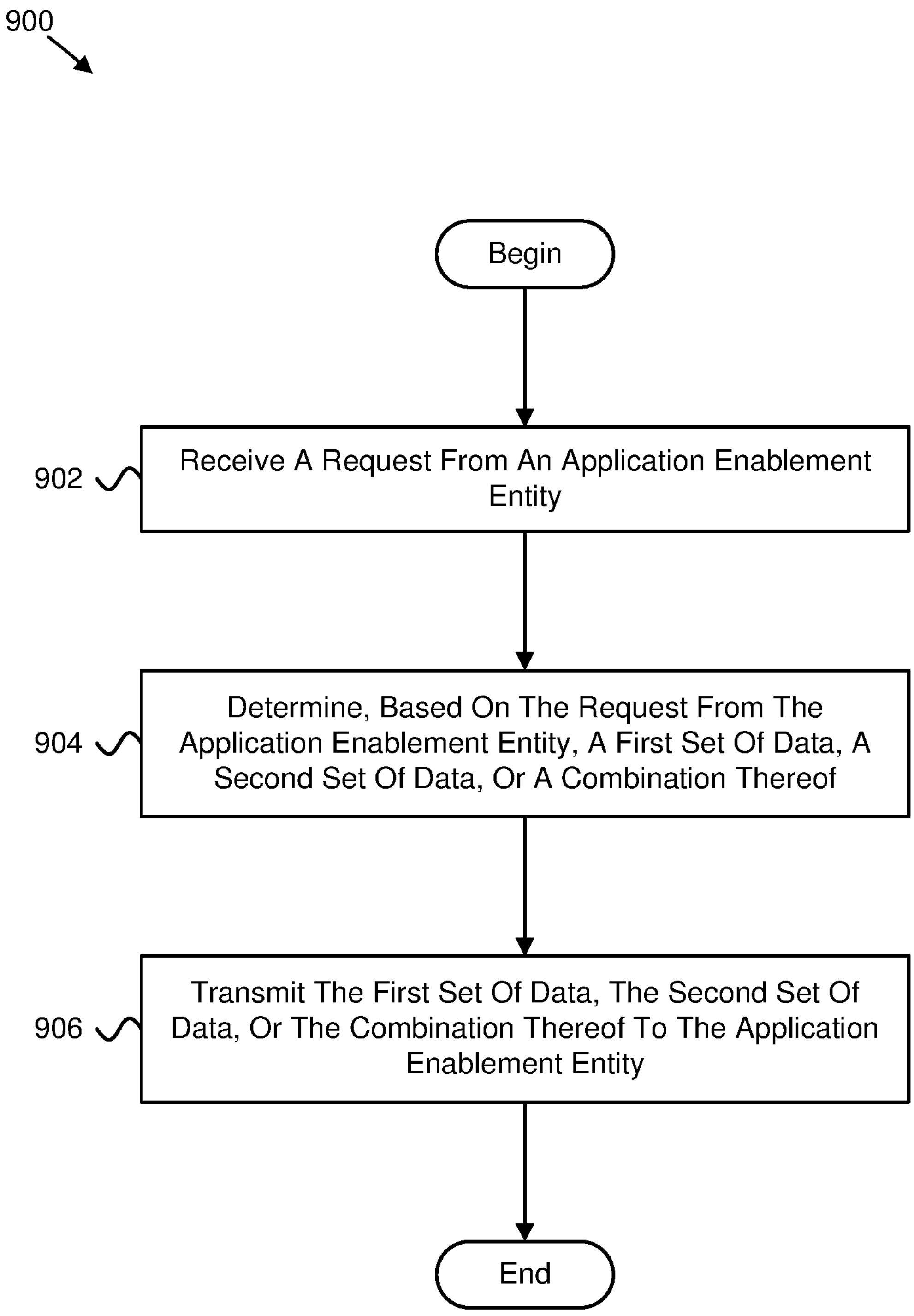
FIG. 9 is a flow chart diagram illustrating a further embodiment of a method for determining application data and/or analytics.

FIG. 9 is a flow chart diagram illustrating another embodiment of a method 900 for determining application data and/or analytics. In some embodiments, the method 900 is performed by an apparatus, such as the network unit 104. In certain embodiments, the method 900 may be performed by a processor executing program code, for example, a microcontroller, a microprocessor, a CPU, a GPU, an auxiliary processing unit, a FPGA, or the like.

In various embodiments, the method 900 includes receiving 902 a request from an application enablement entity. In some embodiments, the method 900 includes determining 904, based on the request from the application enablement entity, a first set of data, a second set of data, or a combination thereof. In certain embodiments, the method 900 includes transmitting 906 the first set of data, the second set of data, or the combination thereof to the application enablement entity.

In one embodiment, a method of an application enablement unit (e.g., AASP 508, 516, 608, 616, an application enablement unit may be one or more of an application enabler server, an application enabler client, a SEAL server and/or client, an application data analytics enabler server, an application data analytics enabler client, a SEALDD server and/or client, an edge enabler server and/or client) comprises: associating an application data analytics event (e.g., an application data analytics event may be a type of data analytics event that triggers the derivation of stats or predictions which correspond to an application layer parameter—such parameter may be a predicted end-to-end application session or server performance parameter) with a combination of a plurality of data collection events and a plurality of network data analytics events (e.g., network data analytics events may be events which correspond to NWDAF related analytics events) based on an application request for end-to-end application related performance analytics (e.g., end-to-end application related performance analytics may be stats or predictions for application parameters related to end to end application sessions performance and/or end to end application server performance); obtaining a first set of data from a plurality of data producing entities, data analytics producing entities, or a combination thereof based on the application data analytics event; configuring a second set of data based on the first set of data, wherein the second set of data comprises at least a portion of the first set of data, an abstraction of the first set of data, or a combination thereof based on the application data analytics event; and deriving application data analytics corresponding to the application data analytics event based on the second set of data.

In certain embodiments, the second set of data comprises data corresponding to different segments contributing to an end-to-end application service, wherein the segments comprise at least one user equipment, a radio access network, a transport network, a core network, a data network, an edge platform, a middleware, a networking stack, a communication interface, an application programming interface, or some combination thereof.

In some embodiments, the method further comprises receiving a first request from an external application (e.g., an external application may be a VAL server, an edge application server, an application server, an application at the device, an application client, an application enabler server, an application enabler client, a DN, a 3rd party service provider, or some combination thereof) for providing application data analytics corresponding to an end-to-end application service (e.g., an end to end application service may be equivalent to an end-to-end application session, and the end-to-end corresponds to the service and/or session between an application at the device and an application server, or among application clients of two or more devices) for at least one application.

In various embodiments, the method further comprises: configuring an association of the application data analytics event with at least one data collection event; and configuring a mapping of the data collection events to at least one data producer.

In one embodiment, the method further comprises configuring an exposure of the derived application data analytics to an application analytics service consumer (e.g., application analytics service consumer may be the AASC 518, 618) based on a vertical application requirement (e.g., a vertical application requirement may be a requirement from a VAL server or client indicating a certain exposure level for the application data analytics), the application data analytics event, an application service profile (e.g., the application service profile may be a profile comprising the KPIs and/or requested application QoS parameters for a given service (e.g., V2X service, IoT service, and so forth)), a slice profile (e.g., the slice profile may be a set of KPIs and/or requested application QoS parameters for a given slice or slice subnet), a service level agreement between the application enablement unit and the application data analytics consumer, or some combination thereof.

In certain embodiments, the second set of data comprises a combination of data corresponding to different granularities (e.g., granularities may refer to time granularities corresponding to data collection and/or reporting, example granularities may be dynamic, semi-static, static, real time, near real time or non-real time, in ms-level, in 100 ms level, in seconds, in minutes, and so forth), data producers, or a combination thereof.

In some embodiments, the second set of data comprises a filtering of data based on data producer priorities (e.g., a data producer priority may be pre-configured by the OAM, by the ADCCF, or by the application enablement unit itself, and provides an indication of which data producer needs to be selected at filtering if two or more data producers provide similar data—such priority may be derived based on a domain where the data producing entity is residing, for example, a data producing entity from 5GC about location reporting may have higher priority than SEAL or edge-cloud provided location reporting), a data producer reliability (e.g., data producer reliability may indicate how reliable a source of information is the data producing entity—for example, a user equipment may not be considered as reliable as a network data producer for providing data—this can be due to the fact that the data may be locally collected without considering the system perspective, or this may be due to the possible fluctuations of performance which may provide unreliable data—also, reliability of the data producer may be related to whether the data producer can be vulnerable to security breaches and/or hacking attacks and the data may not be correct), or a combination thereof.

In various embodiments, the second set of data is determined in real time based on real-time measurements from a user plane.

In one embodiment, the method further comprises transmitting the derived application data analytics to a vertical application, an application function, an application server, a network function, or some combination thereof, based on the application data analytics event.

In certain embodiments, the first set of data, the second set of data, or a combination thereof is determined at a user equipment.

In one embodiment, the derived application data analytics comprise a predictive end to end application related performance parameter, and the predictive end to end application related performance parameter comprises: an end-to-end application session performance (e.g., end to end application session performance may be calculated based on data received at a wireless communication device or at a DN and/or application server and includes one or more of the following parameters: an application QoS parameter (e.g., latency, jitter, data rate, PER and/or reliability), a QoE parameter (e.g., mean opinion score ("MOS"), stalling events, stalling ratio, buffering, rate and resolution changes) for the end to end application session and/or service, and/or a key performance indicator for the end to end session) sustainability indication (e.g., end to end application session performance sustainability indication may include an indication of whether an end to end application session performance parameter may be sustainable for a requested area and time of the day), an end-to-end application session performance change, an end-to-end application server performance (e.g., end to end application server performance may include application server performance that is calculated at a DN and/or application server side and includes one or more of an application QOS (e.g., latency, jitter, data rate, PER and/or reliability), a QoE parameter (e.g., mean opinion score (MOS), stalling events, stalling ratio, buffering, rate and resolution changes), application server load indication, an edge node load indication corresponding to the application server—for the QoS and QoE parameters, the application server performance is calculated (or averaged) based on the performance of a plurality of end to end application sessions which are served by the application server for a given application server service area) sustainability indication (e.g., end to end application server performance sustainability indication may include an indication of whether a target the end to end application server performance parameter may be sustainable for a given area and time horizon), an end-to-end application server performance change, or some combination thereof.

In some embodiments, the derived application data analytics are derived at an application enablement client of at least one user equipment.

In various embodiments, the application data analytics are derived at an edge platform, a cloud platform, a radio access network intelligent controller, or some combination thereof.

In one embodiment, the first set of data comprises: application enabler layer data, control plane data (e.g., control plane data corresponds to data being exposed by a 3GPP defined control plane NF (5GC or RAN control function)—data from a RAN control function may be exposed by an edge node or a RAN intelligent controller and relates to the output of an RRM function), user plane data (e.g., user plane data may be data derived from networking stacks from the UPF or the DN), local user equipment data (e.g., local UE data may include performance data as perceived by the UE related to a network and/or application session—such data may be derived by an application of the UE and/or by the communication part of the UE (AS/NAS layer, PDU layer)—such local UE data may be also collected for UE-to-UE sessions and in certain embodiments may provide performance indications for a group of Ues (e.g., within the same group-based service)), management plane data (e.g., management plane data may correspond to data exposed by a 3GPP management domain and/or OAM), edge platform data (e.g., edge platform data may be data and/or analytics corresponding to performance or load of an edge platform where the application server resides, or data derived from the constituent segments of an end to end session), network analytics data, or some combination thereof.

In one embodiment, an apparatus comprises an application enablement unit. The apparatus further comprises: a processor that: associates an application data analytics event with a combination of a plurality of data collection events and a plurality of network data analytics events based on an application request for end-to-end application related performance analytics; obtains a first set of data from a plurality of data producing entities, data analytics producing entities, or a combination thereof based on the application data analytics event; configures a second set of data based on the first set of data, wherein the second set of data comprises at least a portion of the first set of data, an abstraction of the first set of data, or a combination thereof based on the application data analytics event; and derives application data analytics corresponding to the application data analytics event based on the second set of data.

In certain embodiments, the second set of data comprises data corresponding to different segments contributing to an end-to-end application service, wherein the segments comprise at least one user equipment, a radio access network, a transport network, a core network, a data network, an edge platform, a middleware, a networking stack, a communication interface, an application programming interface, or some combination thereof.

In some embodiments, the apparatus further comprises a receiver that receives a first request from an external application for providing application data analytics corresponding to an end-to-end application service for at least one application.

In various embodiments, the processor: configures an association of the application data analytics event with at least one data collection event; and configures a mapping of the data collection events to at least one data producer.

In one embodiment, the processor configures an exposure of the derived application data analytics to an application analytics service consumer based on a vertical application requirement, the application data analytics event, an application service profile, a slice profile, a service level agreement between the application enablement unit and the application data analytics consumer, or some combination thereof.

In certain embodiments, the second set of data comprises a combination of data corresponding to different granularities, data producers, or a combination thereof.

In some embodiments, the second set of data comprises a filtering of data based on data producer priorities, a data producer reliability, or a combination thereof.

In various embodiments, the second set of data is determined in real time based on real-time measurements from a user plane.

In one embodiment, the apparatus further comprises a transmitter that transmits the derived application data analytics to a vertical application, an application function, an application server, a network function, or some combination thereof, based on the application data analytics event.

In certain embodiments, the first set of data, the second set of data, or a combination thereof is determined at a user equipment.

In one embodiment, the derived application data analytics comprise a predictive end to end application related performance parameter, and the predictive end to end application related performance parameter comprises: an end-to-end application session performance sustainability indication, an end-to-end application session performance change indication, an end-to-end application server performance sustainability indication, an end-to-end application server performance change indication, or some combination thereof.

In some embodiments, the derived application data analytics are derived at an application enablement client of at least one user equipment.

In various embodiments, the application data analytics are derived at an edge platform, a cloud platform, a radio access network intelligent controller, or some combination thereof.

In one embodiment, the first set of data comprises: application enabler layer data, control plane data, user plane data, local user equipment data, management plane data, edge platform data, network analytics data, or some combination thereof.

In one embodiment, a method of a user equipment comprises: receiving a request from an application enablement entity; determining local user equipment data, analytics, or a combination thereof in response to receiving the request from the application enablement entity; and transmitting the local user equipment data, analytics, or the combination thereof to the application enablement entity.

In one embodiment, an apparatus comprises a user equipment. The apparatus further comprises: a receiver that receives a request from an application enablement entity; a processor that determines local user equipment data, analytics, or a combination thereof in response to receiving the request from the application enablement entity; and a transmitter that transmits the local user equipment data, analytics, or the combination thereof to the application enablement entity.

In one embodiment, a method of a network device comprises: receiving a request from an application enablement entity; determining, based on the request from the application enablement entity, a first set of data, a second set of data, or a combination thereof; and transmitting the first set of data, the second set of data, or the combination thereof to the application enablement entity.

In one embodiment, an apparatus comprises a user equipment. The apparatus further comprises: a receiver that receives a request from an application enablement entity; a processor that determines local user equipment data, analytics, or a combination thereof in response to receiving the request from the application enablement entity; and a transmitter that transmits the local user equipment data, analytics, or the combination thereof to the application enablement entity.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. An apparatus for application data analytics in a wireless communication network, the apparatus comprising:

at least one memory; and at least one processor coupled with the at least one memory and configured to cause the apparatus to:

receive a first request from an external application for providing end-to-end application related performance analytics for at least one application;

associate an application data analytics event with a combination of a plurality of data collection events and a plurality of network data analytics events based on the first request for end-to-end application related performance analytics;

obtain a first set of data from a plurality of data producing entities, data analytics producing entities, or a combination thereof based on the application data analytics event;

configure a second set of data based on the first set of data, wherein the second set of data comprises at least a portion of the first set of data, an abstraction of the first set of data, or a combination thereof based on the application data analytics event;

derive application data analytics corresponding to the application data analytics event based on the second set of data, wherein the application data analytics are derived at an edge platform, a cloud platform, a radio access network (RAN) intelligent controller, or a combination thereof; and transmit the derived application data analytics to the external application, the external application comprising a vertical application, an application function, an application server, a network function, or a combination thereof, based on the application data analytics event.

2. The apparatus of claim 1, wherein the second set of data comprises data corresponding to different segments contributing to an end-to-end application service, wherein the segments comprise at least one user equipment (UE), a radio access network (RAN), a transport network, a core network, a data network, an edge platform, a middleware, a networking stack, a communication interface, an application programming interface (API), or a combination thereof.

3. The apparatus of claim 1, wherein the at least one processor is configured to cause the apparatus to:

configure an association of the application data analytics event with at least one data collection event; and configure a mapping of the data collection events to at least one data producer.

4. The apparatus of claim 1, wherein the at least one processor is configured to cause the apparatus to configure an exposure of the derived application data analytics to an application analytics service consumer based on a vertical application requirement, the application data analytics event, an application service profile, a slice profile, a service level agreement between the apparatus and the application analytics service consumer, or a combination thereof.

5. The apparatus of claim 1, wherein the second set of data comprises a combination of data corresponding to different granularities, data producers, or a combination thereof.

6. The apparatus of claim 1, wherein the second set of data comprises a filtering of data based on data producer priorities, a data producer reliability, or a combination thereof.

7. The apparatus of claim 1, wherein the second set of data is determined in real time based on real-time measurements from a user plane.

8. The apparatus of claim 1, wherein the derived application data analytics comprise a predictive end to end application related performance parameter, and the predictive end to end application related performance parameter comprises: an end-to-end application session performance sustainability indication, an end-to-end application session performance change indication, an end-to-end application server performance sustainability indication, an end-to-end application server performance change indication, or a combination thereof.

9. The apparatus of claim 1, wherein the derived application data analytics are derived at an application enablement client of at least one user equipment (UE).

10. The apparatus of claim 1, wherein the first set of data comprises: application enabler layer data, control plane data, user plane data, local user equipment (UE) data, management plane data, edge platform data, network analytics data, or a combination thereof.

* * * * *